UNITED STATES PATENT OFFICE.

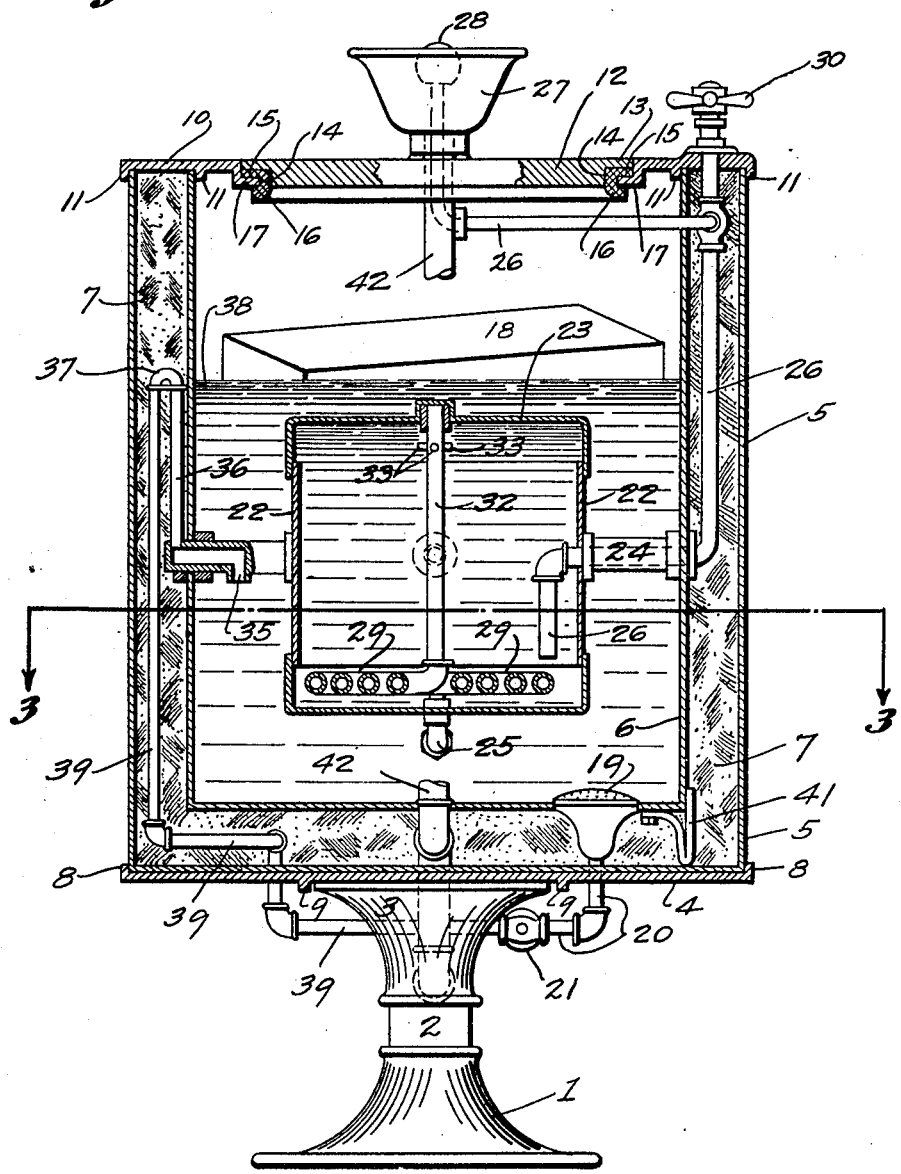

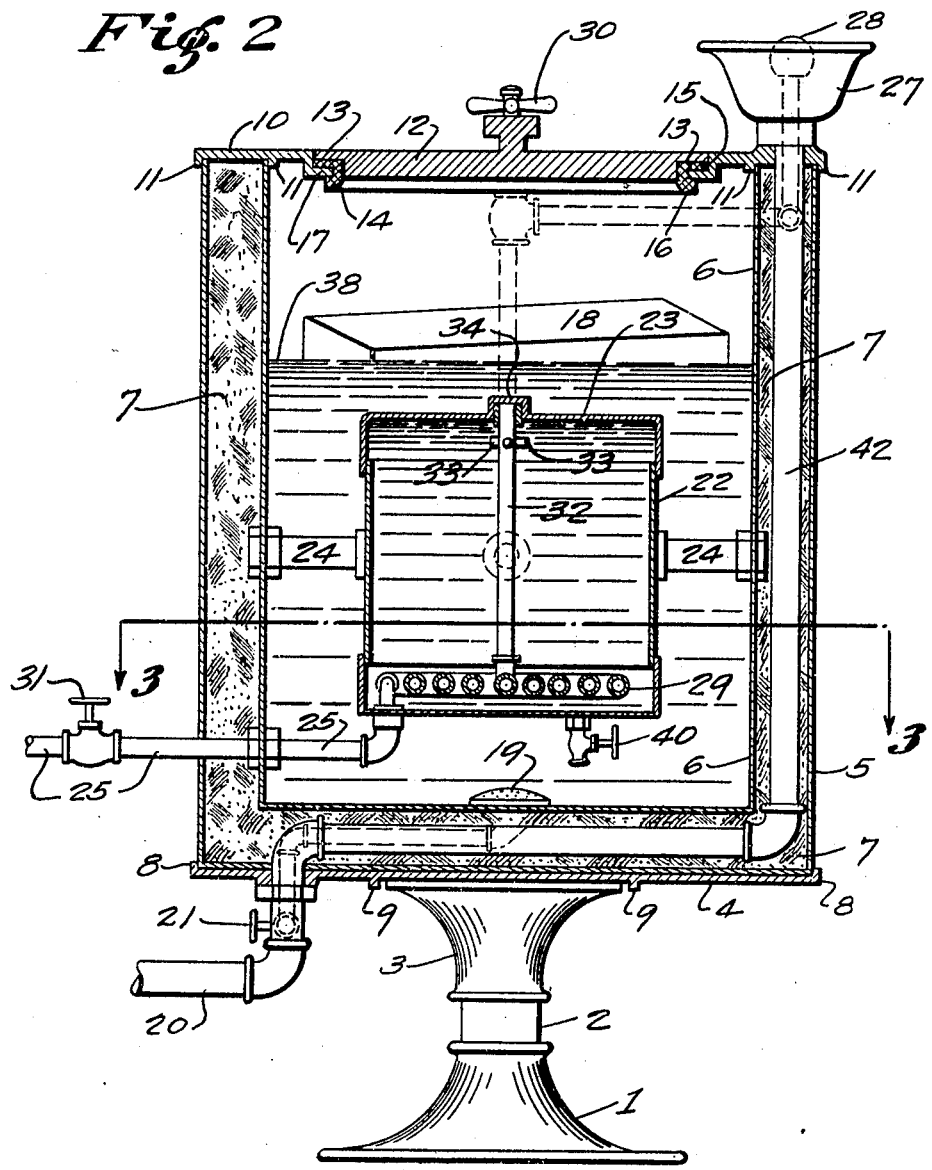

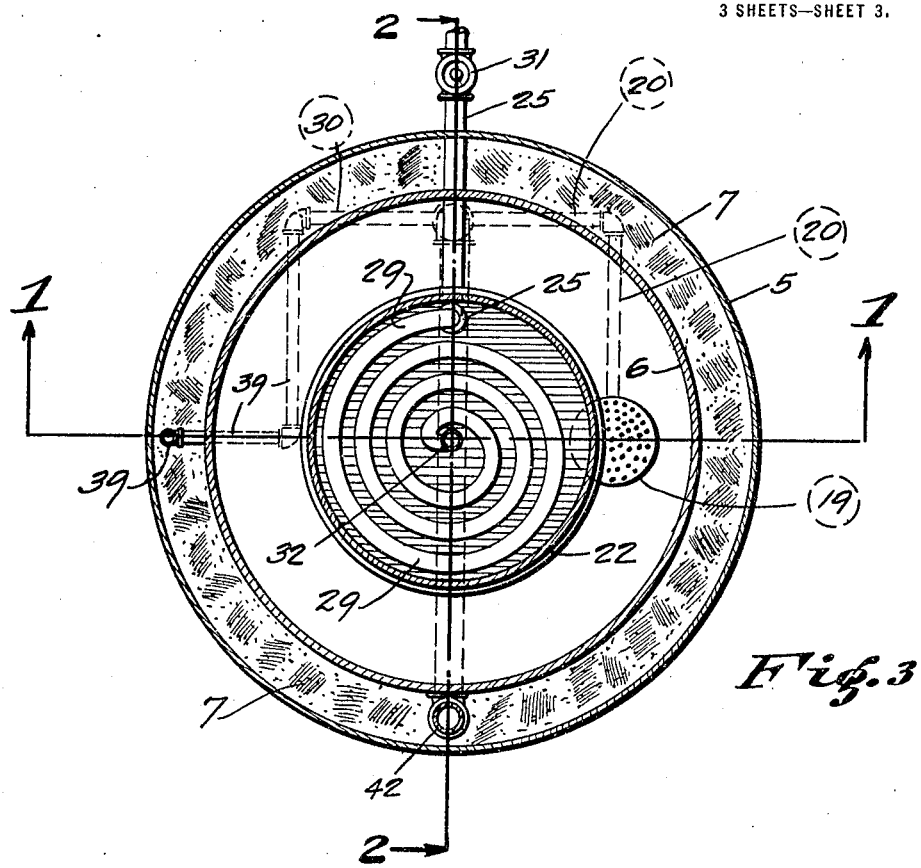

THOMAS J. SHEEHAN, OF ST. LOUIS, MISSOURI.

REFRIGERATING APPARATUS.

1,308,812.　　　　　Specification of Letters Patent.　　Patented July 8, 1919.

Application filed January 12, 1918.　Serial No. 211,473.

*To all whom it may concern:*

Be it known that I, THOMAS J. SHEEHAN, a citizen of the United States, residing at St. Louis, in the State of Missouri, have invented certain new and useful Improvements in Refrigerating Apparatus, of which the following is a specification.

Water at atmospheric temperature or at a temperature of water in water mains is in warm weather not satisfying to quench the thirst, while ice water (by which is meant water derived from the melting of ice or water that has come into immediate contact with ice) is detrimental to the health, because of being intensely cold or on account of impurities in the ice. The object of this invention is to supply water that is indirectly cooled or refrigerated and, more particularly, to provide apparatus for this purpose that is suitable for installation in factories, for street fountains, and in other locations where considerable quantities of refrigerated water will be consumed.

In the accompanying drawings forming part of this specification, in which like numbers of reference denote like parts wherever they occur, Figure 1 is a front sectional elevation taken on the line 1—1 in Fig. 3;

Fig. 2 is a side sectional elevation taken on the line 2—2 in Fig. 3; and

Fig. 3 is a section taken on the line 3—3 in Figs. 1 and 2, showing the helical pipe coil located in the bottom of the storage tank.

The base 1 receives the threaded tubular member 2, which at the opposite end is threaded into the bottom part of support 3, thus forming a cast iron adjustable stand upon which the bed 4 for the metal tank 5 rests.

Within tank 5 is contained another tank 6 of smaller diameter and somewhat less height, the space surrounding the said tank 6 and beneath the same and between the wall of tank 6 and the wall of tank 5 and between the bottom of tank 6 and the bottom of tank 5 being filled with suitable insulating material 7, such, for instance, as ground cork or the like.

The bed 4 is provided with flange 8 to keep tank 5 from sliding off of it, and also with depending flange 9 so as to keep it from sliding off of the flat top of the pedestal member 3.

The top of the space between tanks 5 and 6 containing the insulation 7 is closed by a flat ring 10 having the depending beads 11 to grasp the top edges of tanks 5 and 6 and confine the same as well as hold the said ring 10 in place.

The hole within ring 10 forms a mouth for the tank or receptacle formed by the combination of tanks 5 and 6 and ring 1, as above described, which mouth is normally closed by lid or plate 12 formed with the flange 13 that rests upon the gasket 14 (preferably made of rubber) which is so shaped as to have the upper flange 15 and lower flange 16 overlying and underlying respectively the flange 17 on the inner periphery of ring 10. The lid 12 will be removed, as a general rule, only when it is desired to insert a block or blocks of ice 18 or to cleanse the interior of tank 6. The shape of the gasket 14 prevents its displacement when lid 12 is raised. The strainer 19 prevents straw or the like passing through the drain pipe 20, but water and smaller debris will drain out of tank 6 through drain 20 whenever cock 21 is opened.

A storage tank 22 provided with a normally closed lid 23 is supported by arms 24 from the inside of the wall of tank 6, and also more or less by the water supply pipe 25 and the pipe 26 that carries refrigerated water from tank 22 to the enameled bubbling cup 27 containing the nozzle 28.

The lower end of pipe 26 opens adjacent to the bottom of storage tank 22 and adjacent to the cooling coil 29, thereby drawing off the cooled water from storage tank 22.

The flow of water out of tank 22 through pipe 26 to fountain 27 takes place whenever self-closing cock 30 is opened. Cock 30 is preferably located at the right hand of the drinking cup 27 so as to facilitate its operation by the majority of people. Any suitable drain 42 may be provided from fountain 27 to carry off surplus water, the return of which to tank 22 is prevented by the automatic closing of cock 30.

Pipe 25 connects with the water mains that furnish the supply of water and the entrance of such supply is controlled by cock 31. Pipe 25 leads to one end of the coiled pipe 29, the other end of which connects with pipe 32 having the outlets 33 and its extremity 34 terminating within lid 23. The outlets 33 are within the storage tank 22 but near its top, so that the water most recently entered into tank 22 will be at the top while that which has been in tank 22 longest will be at the bottom, the inlet being, as just stated, at the top of the inside of tank 22 while the mouth of pipe 26 through which the water is drawn out of tank 22 is located near the bottom of tank 22. The natural tendency of cold water is to descend, due to its greater gravity as compared to warm water, and thus as the water near the top of tank 22 becomes chilled it gravitates toward the bottom of the said tank. By the arrangement that has been described whereby the water from the supply main first enters tank 22 adjacent to its bottom and is then forced to pass through all the winds of coil 29 and then to pass through pipe 32 to the upper part of tank 22 the newly admitted water becomes considerably chilled before it is emitted through outlets 33 because coil 29 is located in the bottom of tank 22 where the water is the coldest, and the newly admitted water coming in through pipe 25 is obliged to travel a considerable distance through the said coil 29 before the said water can reach pipe 32.

By this construction the maximum cooling effect from ice 18 is secured because the newly admitted water must spend considerable time in the coldest part of tank 22 and then the same water is not immediately drawn out through pipe 26 but must continue the chilling process by being emitted from pipe 32 only in the uppermost part of tank 22 where the chilling influence continues while it gradually sinks to the bottom of tank 22.

The chilling influence of ice 18 upon the contents of tank 22 is enhanced by allowing the water to surround tank 22 which water will either be initially introduced, as, for instance, by a bucket or will result from the accumulations from melting ice, the ice 18 coming into contact with the outside of tank 22.

To prevent the water within tank 6 accumulating to an undue extent, the overflow outlet 35 is provided, which leads by pipe 36 to the bend 37 at the height of the maximum water line 38. When the water rises as high as the water line 38 the water automatically begins to flow through outlet 35, pipe 36, pipe 39, to drain 20. Outlet 35 is supported by one of the arms 24, cut short for this purpose.

When it is desired to cleanse the interior of tank 22, cock 40 may be opened and the said tank allowed to drain into the tank 6, which in turn drains through strainer 19 into drain 20.

The tank 6 is partially supported by pipes 35, 36, and 39 and by pipe 26, and is additionally supported by a plurality of feet 41.

Having thus described this invention, I hereby reserve the benefit of all changes in form, arrangement, order, or use of parts, as it is evident that many minor changes may be made therein without departing from the spirit of this invention or the scope of the following claim:

In a water cooling apparatus, the combination of a casing comprising inner and outer walls with interposed insulating material therebetween, the casing having an opening in the top, a cover fitted in the opening, a water receptacle in the casing, said receptacle being spaced from the walls of the casing, a service pipe extending through the casing and into the receptacle, and coiled in the bottom of the latter, the end of the service pipe extending vertically from the center of the coil and terminating in the top of the receptacle, a series of short outlet pipes extending from the upper end of the vertical pipe to introduce the water to the receptacle in fine streams, a draw off pipe terminating at the bottom of the receptacle and extending into the casing and toward the top of the latter, a controlling valve in the draw off pipe, a waste pipe extending from the receptacle to the casing, and short connections between the receptacle and the casing to brace the latter, the pipes, and the connections extending from the casing to the receptacle serving to form a support for ice placed in the casing to insure the body of water in the top part of the receptacle being cooled.

In testimony whereof I hereunto affix my signature.

THOS. J. SHEEHAN.

Copies of this patent may be obtained for five cents each, by addressing the "Commissioner of Patents, Washington, D. C."